(12) United States Patent  (10) Patent No.: US 11,209,303 B2
Gracia Verdugo et al.  (45) Date of Patent: Dec. 28, 2021

(54) FILLING LEVEL DETECTION IN A PRINTING FLUID WASTE CONTAINER

(71) Applicant: HEWLETT-PACKARD DEVELOPMENT COMPANY, L.P., Spring, TX (US)

(72) Inventors: Antonio Gracia Verdugo, Sant Cugat del Valles (ES); Javier Deocon Mir, Sant Cugat del Valles (ES); Jeffrey L. Thielman, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/762,100

(22) PCT Filed: Dec. 18, 2017

(86) PCT No.: PCT/US2017/067062
§ 371 (c)(1),
(2) Date: May 6, 2020

(87) PCT Pub. No.: WO2019/125375
PCT Pub. Date: Jun. 27, 2019

(65) Prior Publication Data
US 2020/0355538 A1  Nov. 12, 2020

(51) Int. Cl.
*B41J 2/17* (2006.01)
*G01F 23/292* (2006.01)
*B41J 2/175* (2006.01)

(52) U.S. Cl.
CPC .......... *G01F 23/292* (2013.01); *B41J 2/1721* (2013.01); *B41J 2/17566* (2013.01); *B41J 2002/1742* (2013.01); *B41J 2002/17573* (2013.01)

(58) Field of Classification Search
CPC .............. G01F 23/292; B41K 2/17566; B41K 2002/1742; B41K 2002/17573; B41K 2/185; B41K 29/13; B41K 2/17509; B41K 2/16505; B41K 2/16508; B41J 2/1721; B41J 2/17566; B41J 2002/1742;
(Continued)

(56) References Cited
U.S. PATENT DOCUMENTS 6,274,880 B1  8/2001  Walker
7,033,011 B2  4/2006  Murakimi
7,726,793 B2  6/2010  Yamamoto
(Continued)

FOREIGN PATENT DOCUMENTS

EP   0952433 A1 * 10/1999  ......... G01F 25/0061
JP   2000085143 A * 3/2000
(Continued)

OTHER PUBLICATIONS

EPSON, SureColor F9200 User's Guide, 2015.
(Cont. from above) <https://files.support.epson.com/docid/cpd4/cpd43460.pdf>.

*Primary Examiner* — Sharon Polk
(74) *Attorney, Agent, or Firm* — HP Inc. Patent Department (57) ABSTRACT

A system for detecting a filling level in a printing fluid waste container comprises a waste container that collects excess printing fluid in a reservoir, and an optical sensor unit that detects a filling level of the reservoir on a filling reference surface.

20 Claims, 5 Drawing Sheets

(58) Field of Classification Search
CPC .. B41J 2002/17573; B41J 2/185; B41J 29/13; B41J 2/17509; B41J 2/16505; B41J 2/16508
See application file for complete search history.

(56) References Cited

U.S. PATENT DOCUMENTS

| | | | |
|---|---|---|---|
| 8,328,306 B2 * | 12/2012 | Iwamuro | B41J 2/17513 |
| | | | 347/7 |
| 8,646,860 B1 | 2/2014 | Jones | |
| 9,144,991 B2 | 9/2015 | Kaisha | |
| 2017/0106687 A1 * | 4/2017 | Ono | B41J 2/16585 |
| 2019/0193405 A1 * | 6/2019 | Suzuki | B41J 2/185 |

FOREIGN PATENT DOCUMENTS

| | | | |
|---|---|---|---|
| KR | 19980075805 A | * | 11/1998 |
| KR | 1020090132551 | | 12/2009 |
| WO | WO-2005071368 | | 8/2005 |
| WO | WO-2009058709 | | 5/2009 |

* cited by examiner

FILLING LEVEL DETECTION IN A PRINTING FLUID WASTE CONTAINER

BACKGROUND

The disclosure relates to a system and method for detecting a filling level in a printing fluid waste container, in particular for inkjet printers.

In printing processes such as inkjet printing some printing fluid is used to maintain the nozzles wetted and ready for printing, as well as for cleaning operations of the printheads. This ink is ultimately collected as excess printing fluid in the reservoir of a waste container. Once the reservoir is full, the waste container can be replaced.

DETAILED DESCRIPTION

The disclosure generally relates to a system for detecting a filling level in a printing fluid waste container. The system comprises a waste container that collects excess printing fluid in a reservoir, and an optical sensor unit that detects a filling level of the reservoir on a filling reference surface.

The disclosure further relates to a method for detecting a filling level in a printing fluid waste container, comprising: emitting an optical signal onto a reference filling surface of a reservoir of a printing fluid waste container that collects excess printing fluid; receiving a reflected optical signal; and, from the reflected optical signal, detecting a filling level of the reservoir.

The system and method can reliably detect the filling level in a printing fluid waste container.

In the examples that follow, the system and method according to the disclosure are described with reference to an inkjet printer, such as an inkjet printer employed to print textile dye sublimation inks, sometimes referred to as dye subinks. However, this is a mere example, and in general the printing fluid may be any fluid printing substance used for two-dimensional or three-dimensional printing.

Figure 1:
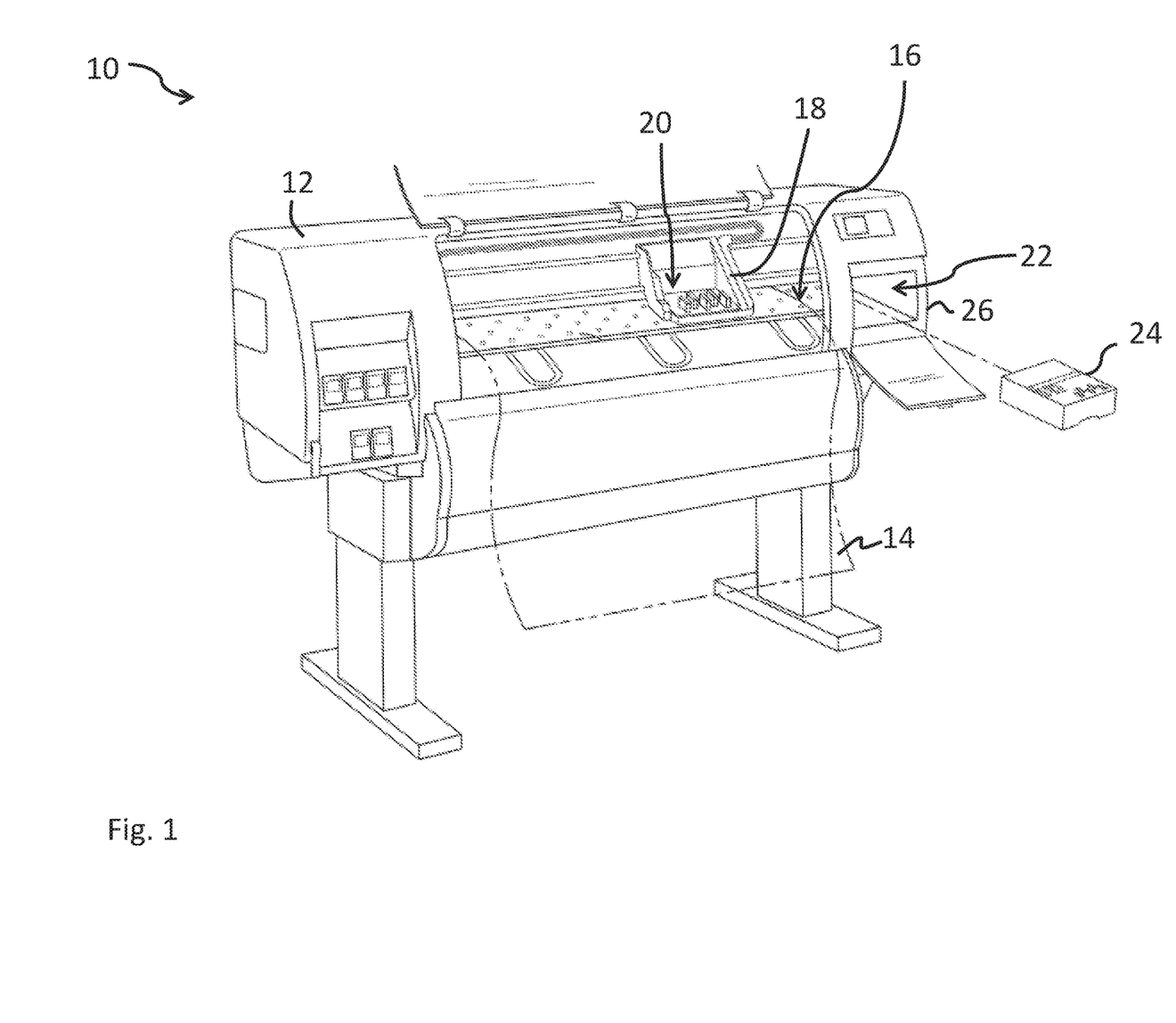
FIG. 1 is a schematic perspective view of an inkjet printer according to an example in which a system for detecting a filling level in a printing fluid waste container can be employed.

FIG. 1 is a schematic perspective illustration of an inkjet printer 10 in which a system and method for detecting a filling level in a printing fluid may be employed.

The printer 10 may be an inkjet printer, such as for printing textile dye subinks, and comprises a printer body 12 that comprises a printing medium transport mechanism for feeding a printing medium 14, such as a sheet of paper, through a print zone 16. For instance, the printing medium transport mechanism may comprise rollers that feed the printing medium 14, and may also comprise related control circuitry. In the print zone 16 a printhead carriage 18 is slidably mounted to move across the width of the printing medium 14 in a transversal direction, i.e., perpendicularly to a transport direction of the printing medium 14. The printhead carriage 18 comprises a plurality of printheads 20, which are adapted to emit printing fluid on the printing medium 14 at predetermined positions and at predetermined time intervals.

As can be further taken from the perspective view of FIG. 1, the printer 10 comprises a rest position 22 to which the printhead carriage 18 can be moved during an idle state of the printer 10. In the example illustrated in FIG. 1, the rest position 22 is located adjacent to the print zone 16 in a peripheral portion of the printer body 12.

In the rest position 22, the printhead carriage 18 may be positioned such that its printheads 20 face a waste container 24. The waste container 24 may be a container adapted to be slidably and removably inserted into the printer body 12 through an opening 26 formed in the printer body 12, as indicated in FIG. 1 by means of a dashed line that represents an insertion path.

The waste container 24 may comprise a plurality of cleaning elements for cleaning the printheads 12 while the printhead carriage 18 is in its rest position 22. During and as part of the cleaning process, the waste container 24 may collect excess printing fluid emitted by the printheads 20.

Figure 2:
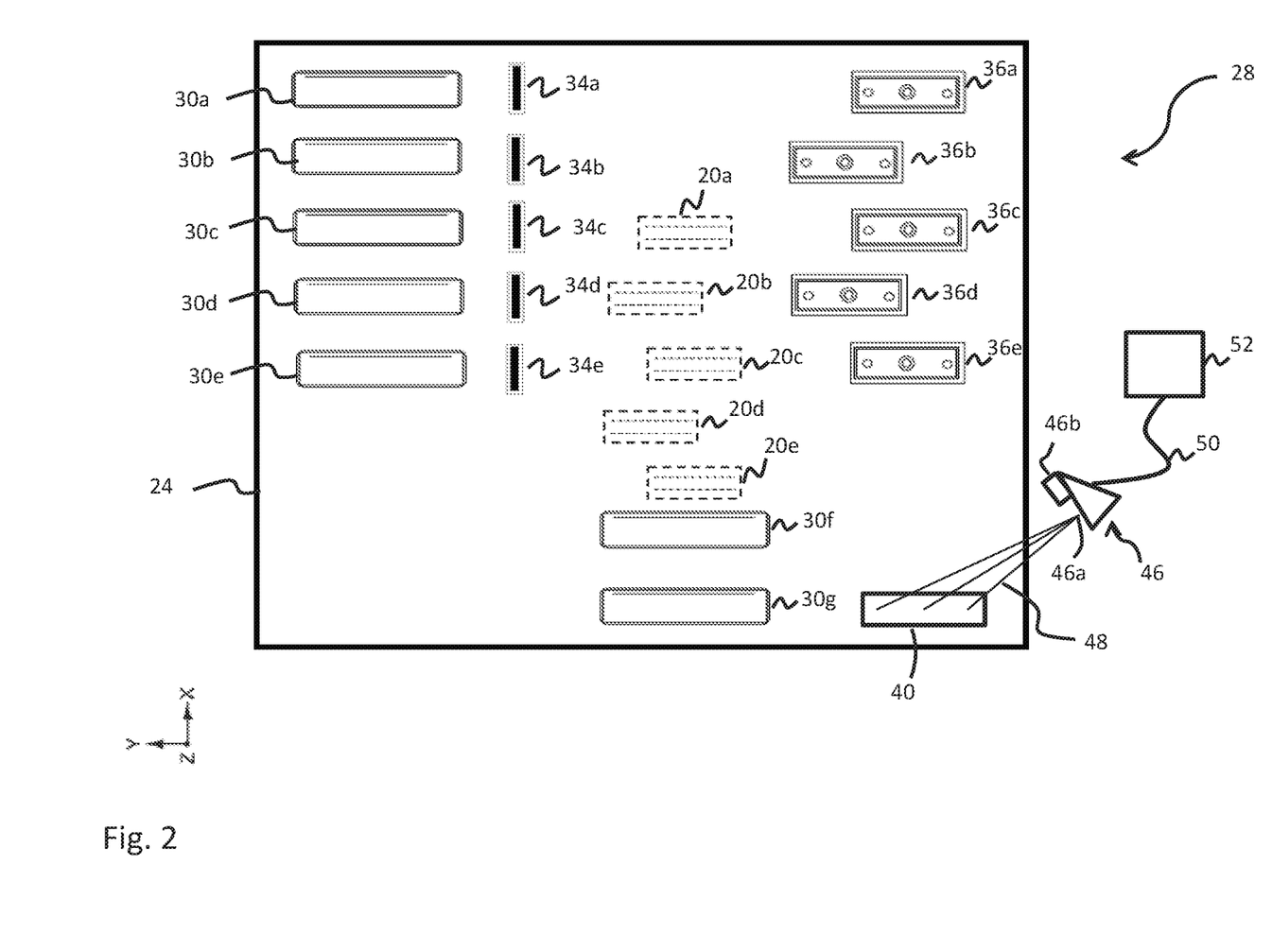
FIG. 2 is a schematic top view of a system for detecting a filling level according to an example.
Figure 3:
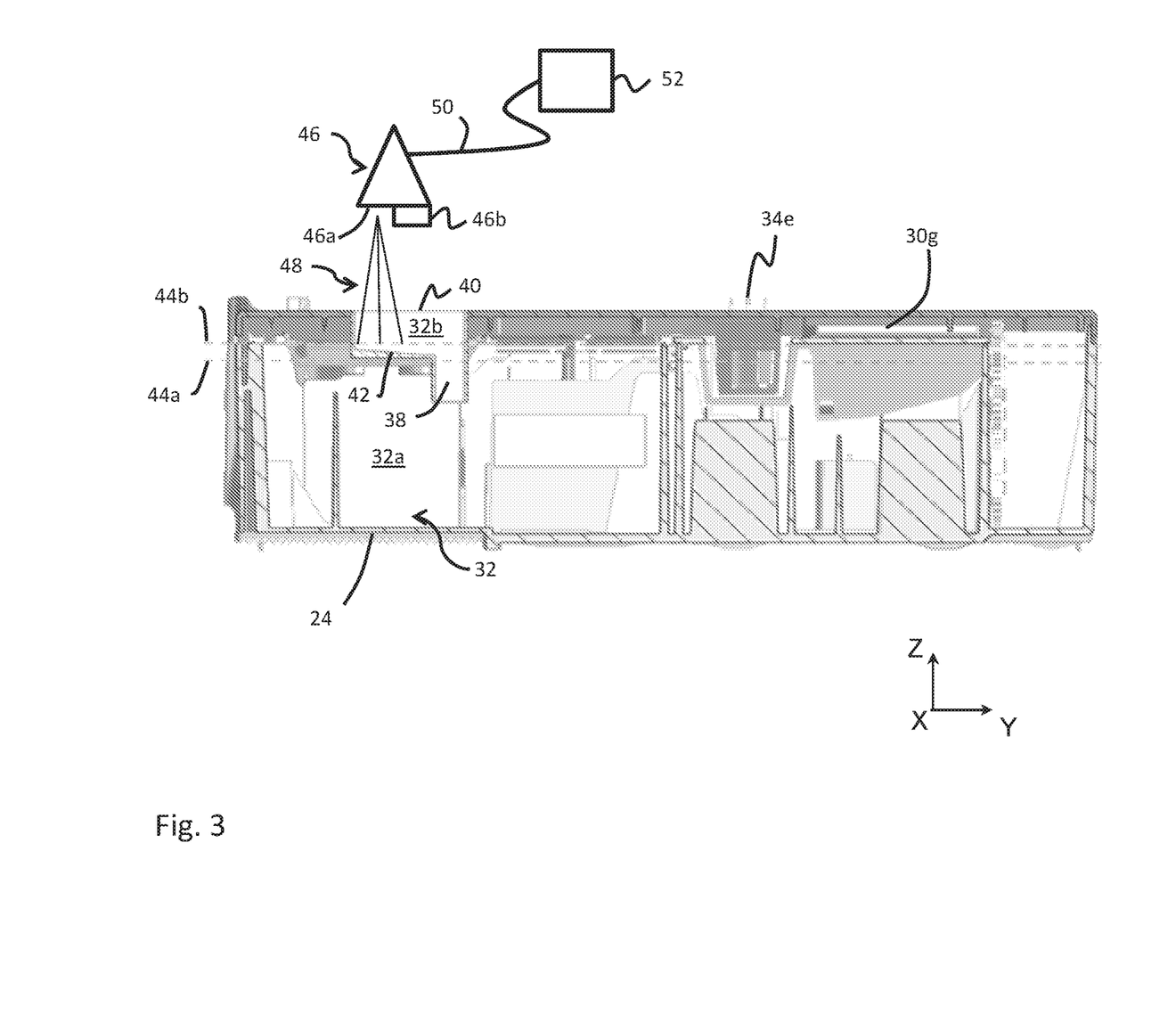
FIG. 3 is a schematic cross-sectional view of a system for detecting a filling level according to an example.

FIG. 2 is a schematic illustration of a system 28 for detecting a filling level comprising the waste container 24 in a top view, whereas FIG. 3 shows a corresponding cross-sectional view.

In FIG. 2, a position of printheads 20a to 20e that face the top surface of the waste container 24 in a cleaning position of the printhead carriage 18 is schematically illustrated with dashed lines. The waste container 24 comprises a plurality of spit rollers 30a to 30g adapted to receive spitted ink from the printheads 20. During the cleaning process, the printhead carriage 18 may be moved from its rest position 22 such that the printheads 20a to 20e face the spit rollers 30a to 30g, or are dragged across the wiper elements 34a to 34e, and the spit rollers 30a to 30g may be continuously rolling to conduct the excess ink emitted by the printheads 20 to an underlying reservoir 32 (shown in the cross-sectional drawing of FIG. 3). Wiper elements 34a to 34e may further be mounted on the top of the waste container 24 to assist in the cleaning.

As can be further taken from FIG. 2, the waste container 24 additionally comprises printhead cover elements 36a to 36e that are adapted to cover the respective printheads 20a to 20e in the rest position 22 of the printhead carriage 18. For instance, before or after the cleaning, the printhead carriage 18 may be moved to the rest position 22 such that the printhead cover elements 36a to 36e face and cover the respective printheads 20a to 20e.

With further reference to FIG. 3, the reservoir 32 for collecting the excess printing fluid comprises a first reservoir 32a, and a second reservoir 32b that is smaller in volume and/or spatial dimensions than the first reservoir 32a and is connected to the first reservoir 32a through a fluid channel 38. In the configuration shown in FIG. 3, the second reservoir 32b is formed closer to an upper surface of the waste container 24 than the first reservoir 32a, such that excess printing fluid first fills the first reservoir 32a and then gradually rises to the second reservoir 32b through the fluid channel 38.

A window 40, such as a glass window or a plexiglass window, is formed in an outer wall of the second reservoir 32b. An inner surface 42 of the second reservoir 32b faces the window 40 and is a slanted to serve as a reference surface for indicating a filling level of the reservoir 32. As can be seen from the cross-sectional view of FIG. 3, once the filling level of the excess printing fluid in the reservoir 32 has reached a lower detection level 44a, the slanted reference surface 42 is still clear of printing fluid. Once the filling level rises further, the slanted reference surface 42 is gradually covered with the excess printing fluid. At an upper detection level 44b, the entire slanted surface 42 is covered. In FIG. 3, the lower detection level 44a and the upper detection level 44b are schematically indicated with dashed lines.

As can be further taken from FIGS. 2 and 3, the system 28 additionally comprises an optical sensor unit 46 that detects the filling level of the printing fluid on the filling reference surface 42. The optical sensor unit 46 comprises an emitting element 46a that emits an optical signal 48, such as a light signal in the visible wavelength range, infrared wavelength range or ultraviolet wavelength range, through the window 40 and onto the reference surface 42.

The optical sensor unit 46 further comprises a receiving element 46b that is adapted to detect the optical signal that is reflected off the filling reference surface 42 and/or the printing fluid covering the reference surface 42. A reflection coefficient of those portions of the reference surface 42 that are already covered with printing fluid may be different from a reflection coefficient of those portions of the reference surface 42 that are still clear of the printing fluid, and hence the reflected optical signal received by the receiving element 46b may differ depending on the filling level of the reservoir 32. The optical sensor unit 46 may emit a corresponding filling signal 50 in response to the detected optical signal to a control unit 52, wherein the control unit 52 may determine the corresponding filling level of the printing fluid in the reservoir 32.

In some examples, the filling signal 50 may be an analog signal. In other examples, the filling signal 50 may be a digital data signal emitted by the optical sensor unit 46. For instance, the filling signal 50 may comprise information on the percentage of the reference surface 42 that is already covered with the printing fluid.

A relatively narrow fluid channel 38 between the first reservoir 32a and the second reservoir 32b may prevent waves or splatters in the first reservoir 32a from reaching the second reservoir 32b and affecting the measurement of the fluid level.

Once the fluid level exceeds the lower detection level 44a and hence the printing fluid starts to cover the reference surface 42, the control unit 52 may emit an alert signal to alert a user that the reservoir 32 is near maximum capacity, and the waste container 24 should be replaced. Once the fluid level reaches the upper detection level 44b, and hence the reference surface 42 is fully covered, the control unit 52 may emit another alert signal indicating that the waste container has reached its maximum capacity, and cannot receive any more excess printing fluid. The control unit 52 may also trigger the printer 10 to interrupt its printing operation until the waste container 24 has been replaced, so as to avoid spillage of excess printing fluid.

In order to make detection of the filling level more accurate and reliable, the system may comprise a further optical sensor unit that detects the filling level on another filling reference surface at a different location.

FIGS. 2 and 3 show the optical sensor unit 46 and control unit 52 as separate units. However, this is for illustration, and in other examples, the optical sensor unit 46 and control unit 52 may be integrated into a common unit.

Figure 4:
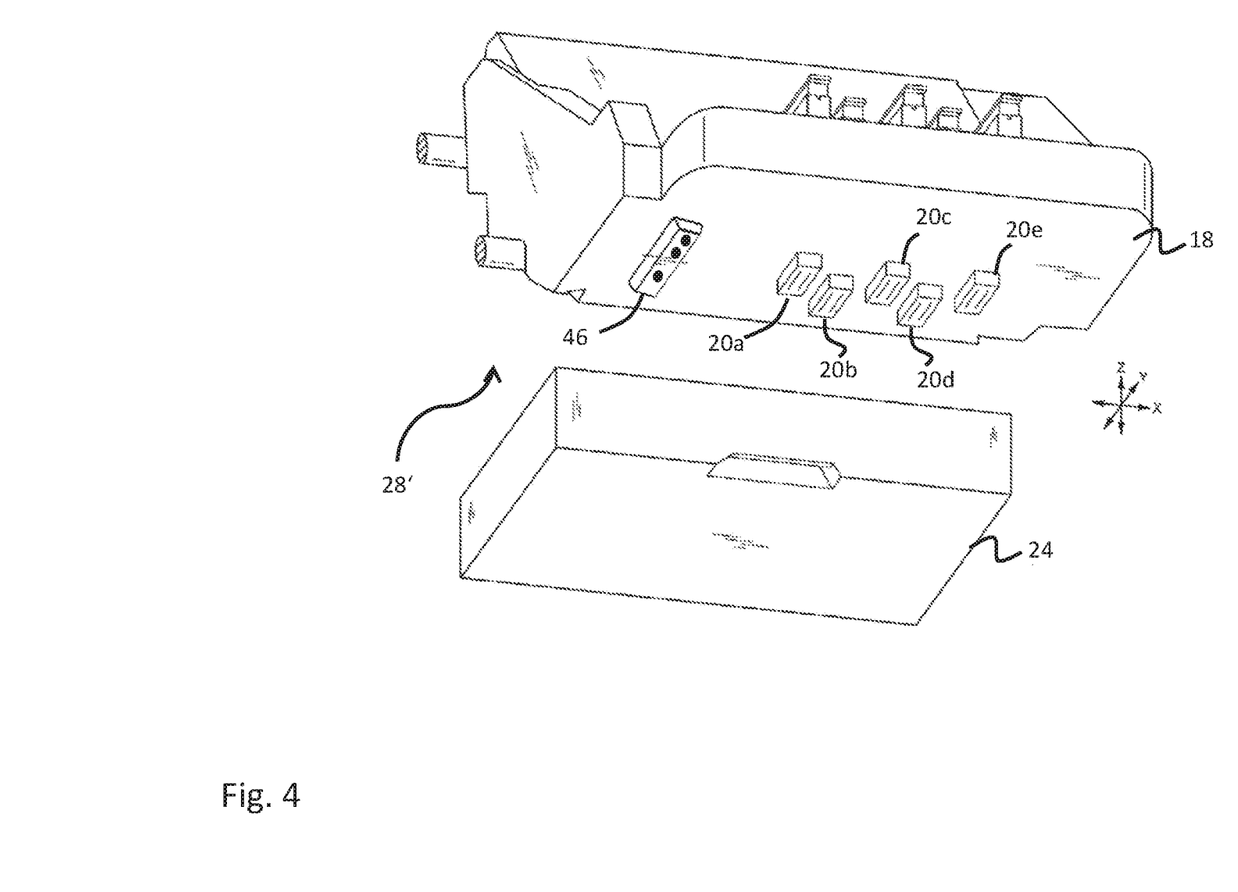
FIG. 4 is a schematic perspective view of a system for detecting a filling level with an optical sensor unit integrated into a printhead carriage according to an example.

FIG. 4 is a schematic perspective view of a system 28' for detecting a filling level in a printing fluid waste container that generally corresponds to the example discussed above with reference to FIGS. 1 to 3, and corresponding elements have the same reference numerals. However, in the configuration of FIG. 4 the optical sensor unit 46 is mounted to an underside of the printhead carriage 18. The control unit (not shown in FIG. 4) may be part of the processing unit for operating the printer 10.

Figure 5:
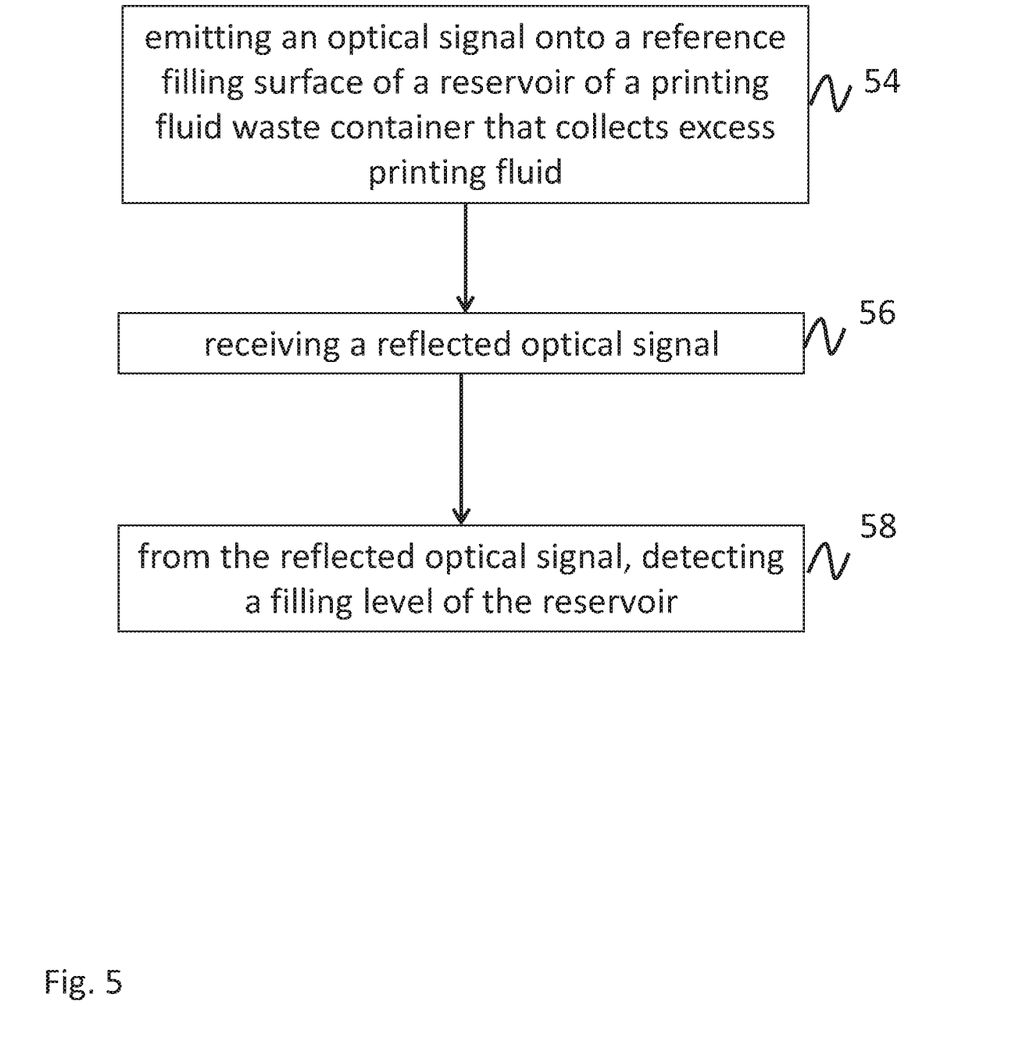
FIG. 5 is a flow diagram of a method for detecting a filling level in a printing fluid waste container according to an example.

FIG. 5 is a schematic flow diagram for illustrating a method for detecting a filling level in a printing fluid waste container according to an example.

In a block 54, an optical signal is emitted onto a reference filling surface of a reservoir of a printing fluid waste container that collects excess printing fluid.

In a block 56, a reflected optical signal is received.

In a block 58, a filling level of the reservoir is detected from the reflected optical signal.

In summary, in a first aspect the disclosure relates to a system for detecting a filling level in a printing fluid waste container, comprising a waste container that collects excess printing fluid in a reservoir, and an optical sensor unit that detects a filling level of the reservoir on a filling reference surface.

In the system according to the disclosure, the optical sensor unit may detect a level of printing fluid on the filling reference surface. This allows an accurate and reliable assessment of the excess printing fluid that has accumulated in the reservoir of the waste container, which may be employed to signal to a user when the waste container is full, or almost full, and needs to be replaced.

In an example, the filling reference surface forms part of the reservoir boundary, or is in fluid connection with the reservoir.

In particular, the filling reference surface may be an inner surface of the reservoir.

According to an example, the waste container comprises a window in an outer wall of the reservoir. The optical sensor unit may be positioned externally to the reservoir and may detect the filling level through the window.

A window, in the sense of the disclosure, may be any opening in the wall of the reservoir, wherein the opening is at least partially transparent for optical radiation emitted by the optical sensor unit.

In some examples, the window may be an open window, such as a through-hole in the wall of the reservoir or waste container. In other examples, the window may be at least partially covered. In particular, the window may be a glass window or an acrylic glass window, or a window made of a transparent plastic material.

In an example, the filling reference surface is an inner surface of the reservoir, wherein the window faces the inner surface, and wherein the optical sensor detects a level of printing fluid on the inner surface.

The filling reference surface may be a slanted surface.

In particular, the filling reference surface may be slanted with respect to a fluid surface of the printing fluid in the reservoir.

Once the reservoir fills up with the excess printing fluid, the excess printing fluid will gradually cover the slanted surface. How much of the slanted surface is covered with the excess printing fluid may give a reliable indication of the filling level of the reservoir.

In an example, the optical sensor unit hence detects how much of the slanted surface is covered with the excess printing fluid.

In an example, the reservoir comprises a first reservoir and a second reservoir, wherein the second reservoir is smaller than the first reservoir and in fluid connection with the first reservoir. The filling reference surface may be an inner surface and/or a boundary surface of the second reservoir.

According to the example, the filling level of the reservoir may be detected in the second reservoir, which may be a reservoir in which the fluid level is protected from waves or splatters, and hence may provide a particularly reliable indication of the filling level of the excess printing fluid.

In an example, the second reservoir may be connected to the first reservoir by means of a fluid channel, in particular a fluid channel having a diameter smaller than a diameter of the first reservoir and a diameter of the second reservoir.

The fluid channel may protect the fluid level in the second reservoir against waves or swell that might compromise the accuracy of the fluid level measurement.

An optical sensor unit, in the sense of the present disclosure, may be any sensor unit adapted to emit an optical signal. The optical signal may be any optical signal in any wavelength range, and in particular is not limited to optical wavelengths in the visible range.

The optical sensor unit may further be adapted to detect an optical signal reflected off the printing fluid or the filling reference surface.

In an example, the optical sensor unit comprises an emitting element that emits an optical signal, and a receiving element that detects an optical signal emitted by the emitting unit and reflected off the printing fluid or the filling reference surface.

The emitting element and the receiving element may be separate elements. In other examples, the emitting element and the receiving element may be integrated into a common unit.

In configurations in which the waste container comprises a window in an outer wall of the reservoir, the receiving element may be adapted to detect an optical signal emitted by the emitting unit and reflected off the filling reference surface through the window.

The optical sensor unit may provide a filling signal in response to a detected filling level.

In particular, the system may, in some examples, comprise a control unit coupled to the optical sensor unit, wherein the control unit is adapted to receive the filling signal from the optical sensor unit, and is further adapted to emit an alert signal in case a detected filling level is no smaller than a predetermined filling threshold.

The control unit may be adapted to compare the detected filling level against the predetermined filling threshold.

The alert signal may indicate to a user that it is time to replace the waste container.

In some examples, the control unit and the sensor unit are separate units. In other examples, the control unit may be integrated into the optical sensor unit.

According to some examples, the waste container may comprise an opening for collecting printing fluid, the opening being in fluid connection with the reservoir.

The excess printing fluid may be excess printing fluid from a printer, in particular from an inkjet printer.

The waste container may collect printing fluid from a printhead of the printer.

In particular, the waste container may comprise a cleaning mechanism for cleaning the printhead, and the excess printing fluid may be printing fluid used for cleaning the printhead.

The cleaning mechanism may comprise spit rollers and/or wiper elements for cleaning the printhead.

In a second aspect, the disclosure relates to a printer comprising a system with some or all of the features described above.

In particular, the printer may be a printer for two-dimensional printing or three-dimensional printing.

In an example, the waste container may be mounted to face a rest position of a printhead carriage of the printer, and may be adapted to collect the excess printing fluid from a printhead of the printhead carriage.

In a third aspect, the disclosure relates to a method for detecting a filling level in a printing fluid waste container, comprising: emitting an optical signal onto a reference filling surface of a reservoir of a printing fluid waste container that collects excess printing fluid; receiving a reflected optical signal; and from the reflected optical signal, detecting a filling level of the reservoir.

According to an example, the optical signal may be emitted through a window in an outer wall of the reservoir.

The reference filling surface may be an inner surface of the reservoir, and the optical signal may be reflected from the inner surface.

According to an example, detecting the filing level may comprise detecting how much of the reference filling surface is covered with the printing fluid.

The method may comprise comparing the detected filling level against a filling threshold.

The method may further comprise the emitting an alert signal in case a detected filling level is no smaller than the filling threshold.

The filling threshold may be a predetermined threshold that may be set by the user or manufacturer, and may be employed to assess when to replace the waste container.

For instance, in some examples, the filling threshold may correspond to a filling level in which 50% of the reference surface is covered with printing fluid, or 75% of the reference surface is covered with printing fluid. On the detected filling level reaches or surpasses the filling threshold, an alert signal may be emitted.

The examples described above and the Figures merely serve to illustrate the techniques of the present disclosure and the beneficial effects associated therewith, but should not be understood to imply any limitation. The scope of the present disclosure should be determined from the appended claims.

REFERENCE SIGNS 10 printer
12 printer body
14 printing medium
16 print zone
18 printhead carriage
20 printheads
20a-20e printheads
22 rest position of printhead carriage 18
24 waste container
26 opening for waste container 24
28, 28' system for detecting a filling level
30a-30g spit rollers
32 reservoir
32a first reservoir
32b second reservoir
34a-34e wiper elements
36a-36e printhead cover elements
38 fluid channel
40 window
42 reference surface 44a lower detection level
44b upper detection level
46 optical sensor unit
46a emitting element of optical sensor unit 46
46b receiving element of optical sensor unit 46
48 optical signal
50 filling signal
52 control unit

The invention claimed is:

1. A system for detecting a filling level in a printing fluid waste container, comprising:
a waste container that collects excess printing fluid in a reservoir; and
an optical sensor unit that detects a filling level of the reservoir on a filling reference surface;
wherein the reservoir comprises a first reservoir and a second reservoir, the second reservoir being smaller than the first reservoir and in fluid connection with the first reservoir.

2. The system according to claim 1, wherein the waste container comprises a window in an outer wall of the reservoir, and wherein the optical sensor unit is positioned externally to the reservoir and detects the filling level through the window.

3. The system according to claim 2, wherein the filling reference surface is an inner surface of the reservoir, wherein the window faces the inner surface, and wherein the optical sensor unit detects a level of printing fluid on the inner surface.

4. The system according to claim 1, wherein the filling reference surface is an inner surface of the second reservoir.

5. The system according to claim 1, wherein the optical sensor unit comprises an emitting element that emits an optical signal, and a receiving element that detects an optical signal emitted by the emitting unit and reflected off the printing fluid or the filling reference surface.

6. The system according to claim 1, wherein the optical sensor unit provides a filling signal that indicates a detected filling level of fluid in the waste container.

7. The system according to claim 6, further comprising a control unit coupled to the optical sensor unit, wherein the control unit receives the filling signal, and emits an alert signal in case a detected filling level exceeds a filling threshold.

8. The system according to claim 7, wherein the control unit is to interrupt printing operation in response to a filling signal indicating the waste container has been filled to capacity.

9. A printer comprising the system according to claim 1.

10. The printer according to claim 9, wherein the waste container is mounted to face a rest position of a printhead carriage of the printer, and collects the excess printing fluid from a printhead of the printhead carriage.

11. The system according to claim 1, wherein the filling reference surface is a slanted surface arranged so that, as fluid accumulates in the waste container, the fluid covers a larger proportion of the slanted surface, the accumulated fluid being between the slanted surface and an emitting element of the optical sensor unit so as to change a reflected optical signal from the slanted surface to the optical sensor unit as the covered proportion of the slanted surface changes.

12. The system according to claim 1, wherein the waste container comprises a plurality of spit rollers or wiper elements to collect excess printing fluid for collection in the reservoir.

13. The system according to claim 1, wherein the optical sensor unit is mounted to an underside of a printhead cartridge.

14. A system for detecting a filling level in a printing fluid waste container, comprising:
a waste container that collects excess printing fluid in a reservoir; and
an optical sensor unit that detects a filling level of the reservoir on a filling reference surface;
wherein the filling reference surface is a slanted surface arranged so that, as fluid accumulates in the waste container, the fluid covers a larger proportion of the slanted surface, the accumulated fluid being between the slanted surface and an emitting element of the optical sensor unit so as to change a reflected optical signal from the slanted surface to the optical sensor unit as the covered proportion of the slanted surface changes.

15. The system according to claim 14, wherein the reservoir comprises a first reservoir and a second reservoir, the second reservoir being smaller than the first reservoir and in fluid connection with the first reservoir, wherein the filling reference surface is an inner surface of the second reservoir.

16. A method for detecting a filling level in a printing fluid waste container, comprising:
emitting an optical signal onto a reference filling surface of a reservoir of a printing fluid waste container that collects excess printing fluid, wherein the reservoir comprises a first reservoir and a second reservoir, the second reservoir being smaller than the first reservoir and in fluid connection with the first reservoir, and the filling reference surface is an inner surface of the second reservoir;
the method further comprising:
preventing waves or splatter of fluid from the first reservoir from reaching the filling reference surface in the second reservoir by limiting width of the fluid connection between the first and second reservoirs;
receiving a reflected optical signal; and
from the reflected optical signal, detecting a filling level of the reservoir.

17. The method according to claim 16, wherein the optical signal is emitted through a window in an outer wall of the reservoir.

18. The method according to claim 16, wherein the reference filling surface is an inner surface of the reservoir, and the optical signal is reflected from the inner surface.

19. The method according to claim 16, wherein detecting the filing level comprises detecting how much of the reference filling surface is covered with the printing fluid.

20. The method according to claim 16, further comprising: emitting an alert signal in case a detected filling level exceeds a filling threshold.

* * * * *